(12) United States Patent
Otsuka et al.

(10) Patent No.: US 9,251,029 B2
(45) Date of Patent: Feb. 2, 2016

(54) LOCATIONAL PREDICTION OF FAILURES

(71) Applicants: AT&T Intellectual Property I, L.P., Atlanta, GA (US); FUJITSU LIMITED, Kawasaki (JP)

(72) Inventors: Hiroshi Otsuka, Kawasaki (JP); Kaustubh Joshi, Scotch Plain, NJ (US); Matti A. Hiltunen, Morristown, NJ (US); Edward Scott Daniels, Wadsworth, OH (US); Yasuhide Matsumoto, Kawasaki (JP)

(73) Assignees: AT&T INTELLECTUAL PROPERTY I, L.P., Atlanta, GA (US); FUJITSU LIMITED, Kawasaki-Shi, Kanagawa (JP)

( * ) Notice: Subject to any disclaimer, the term of this patent is extended or adjusted under 35 U.S.C. 154(b) by 187 days.

(21) Appl. No.: 14/042,089

(22) Filed: Sep. 30, 2013

(65) Prior Publication Data

US 2015/0095718 A1 Apr. 2, 2015

(51) Int. Cl.
*G06F 11/00* (2006.01)
*G06F 11/34* (2006.01)
*G06N 99/00* (2010.01)

(52) U.S. Cl.
CPC .......... *G06F 11/3409* (2013.01); *G06N 99/005* (2013.01)

(58) Field of Classification Search
CPC .................................................. G06F 11/3409
See application file for complete search history.

(56) References Cited

U.S. PATENT DOCUMENTS

| 4,858,224 | A | 8/1989 | Nakano et al. | |
| 6,026,145 | A | 2/2000 | Bauer et al. | |
| 6,353,902 | B1 * | 3/2002 | Kulatunge et al. | 714/712 |
| 6,714,893 | B2 | 3/2004 | Busche et al. | |
| 6,896,179 | B2 | 5/2005 | Satoh et al. | |
| 7,272,755 | B2 | 9/2007 | Smith | |
| 7,480,817 | B2 | 1/2009 | Fan et al. | |
| 7,627,388 | B2 | 12/2009 | August et al. | |
| 7,774,671 | B2 | 8/2010 | Dempsey | |
| 8,140,914 | B2 * | 3/2012 | Murphy et al. | 714/47.1 |
| 8,301,414 | B2 | 10/2012 | Cheng et al. | |
| 2003/0005107 | A1 * | 1/2003 | Dulberg et al. | 709/223 |
| 2007/0192065 | A1 | 8/2007 | Riggs et al. | |
| 2010/0322640 | A1 | 12/2010 | Yamada | |
| 2011/0083043 | A1 * | 4/2011 | Chan | 714/37 |
| 2012/0203543 | A1 * | 8/2012 | Folmer et al. | 704/9 |
| 2012/0254669 | A1 * | 10/2012 | Xia et al. | 714/47.2 |
| 2012/0310558 | A1 | 12/2012 | Taft | |
| 2013/0159787 | A1 * | 6/2013 | Yingling et al. | 714/47.3 |
| 2014/0053025 | A1 * | 2/2014 | Marvasti et al. | 714/37 |

OTHER PUBLICATIONS

Salfner, F.; Lenk, M. and Malek, M., "A survey of online failure prediction methods", ACM Comput. Surv., 2010, 42, 10:1-10:42.
Kiciman, E. and Fox, A. "Detecting application-level failures in component-based Internet services". IEEE Transactions on Neural Networks, 2005, 16, 1027-1041.

(Continued)

*Primary Examiner* — Philip Guyton
(74) *Attorney, Agent, or Firm* — Scott P. Zimmerman, PLLC

(57) ABSTRACT

Methods, systems, and products predict locations of failures. Messages historically received are analyzed to predict a future failure. A pattern in the messages historically received is used to retrieve a template. A location of the future failure is predicted from the template.

17 Claims, 13 Drawing Sheets

(56) References Cited

OTHER PUBLICATIONS

Jiang, M.; Munawar, M.; Reidemeister, T. and Ward, P. "Dependency-aware fault diagnosis with metric-correlation models in enterprise software systems". International Conference on Network and Service Management (CNSM), 2010, 134-141.

Gainaru, A.; Cappello, F. and Kramer W. "Taming of the Shrew: Modeling the Normal and Faulty Behaviour of Large-scale HPC Systems". IEEE 26$^{th}$ International Parallel Distributed Processing Symposium (IPDPS), 2012, 1168-1179.

Gainaru, A.; Cappello, F.; Fullop, J.; Trausan-Matu, S. and Kramer, W., "Adaptive event prediction strategy with dynamic time window for large-scale HPC systems", Managing Large-scale Systems via the Analysis of System Logs and the Application of Machine Learning Techniques, ACM, 2011, 4:1-4:8.

Makanju, A.; Zincir-Heywood, A. and Milios, E. "Interactive learning of alert signatures in High Performance Cluster system logs". Network Operations and Management Symposium (NOMS), 2012 IEEE, 2012, 52-60.

Lim, C.; Singh, N. and Yajnik, S. "A log mining approach to failure analysis of enterprise telephony systems". IEEE International Conference on Dependable Systems and Networks (DSN), 2008, 398-403.

Clemm, A.and Hartwig, M., "NETradamus: A forecasting system for system event messages", IEEE Network Operations and Management Symposium (NOMS), 2010, 623-630.

Cheng, L.; Qiu, X.-s.; Meng, L.; Qiao, Y. and Li, Z.-q.,, "Probabilistic fault diagnosis for IT services in noisy and dynamic environments", 11th IFIP/IEEE international Symposium on Integrated Network Management, 2009, pp. 149-156.

Zheng, Z.; Lan, Z.; Gupta, R.; Coghlan, S. and Beckman, P. , "A practical failure prediction with location and lead time for Blue Gene/P", Workshops of the IEEE International Conference on Dependable Systems and Networks (DSN-W), 2010, pp. 15-22.

Y. Watanabe, H. Otsuka, M. Sonoda, S. Kikuchi and Y. Matsumoto, "Online Failure Prediction in Cloud Datacenters by Real-time Message Pattern Learning", IEEE International Conference on Cloud Computing Technology and Science (CloudCom), 2012, 504-511.

Kavulya, S.P.; Daniels, S.; Joshi, K.; Hiltunen, M.; Gandhi, R.; and Narasimhan, P., "Draco: Statistical diagnosis of chronic problems in large distributed systems", IEEE International Conference on Dependable Systems and Networks (DSN), 2012.

http://aws.amazon.com/cloudformation/.

Lou, J.-G.; Fu, Q.; Yang, S.; Xu, Y. and Li, J., "Mining invariants from console logs for system problem detection". Proceedings of the USENIX annual technical conference, 2010, 24-24.

Kavulya, S.; Joshi, K.; Giandomenico, F. and Narasimhan, P., "Failure Diagnosis of Complex Systems". Resilience Assessment and Evaluation of Computing Systems, Springer Berlin Heidelberg, 2012, 239-261.

Thibodeau, P and Vijayan J. "Amazon EC2 Service Outage Reinforces Cloud Doubts" Computer World 45.9 (2011): 8-8.

\* cited by examiner

FIG. 7

CreateTemplates ()

1:   $m_t$: Target message
2:   $m_s$: Source message
3:   For m=0; m++; m<$m_k$.size()
4:   For n=0;n++; n<$f_t$.size()
5:     If $m_k$.size() < n
6:     If $m_k$.get(m) == $f_t$.get(n)
7:     T := {type($f_t$), m, type($m_k$), n}
8:     Output (T)
9:     End
10:  End
11:  End
12:  End

FIG. 9

| Actual Failure message | 2012-5-19 10:16:25, server01, AB:PerfMonitor:, ERROR:, Monitoring, value, of, Object(PORT Availability), is, below, than, lower, error, level., (Device, Name:sm-svr:server01_PP, Detect Value:-1.000, Threshold, Value:-0.100, Detect, Times:3, Detect, Check, Times:3) |
|---|---|
| Prediction | 2012-5-19 09:54:50 |
| Templates of Location | {30,2,14,2}, {30,2,30,2}, {30,2,39,2} |
| Locations predicted | "server01", "server02", "server03" |

FIG. 10

| Actual failure message | 2012-4-28 17:20:18, server11, UX:MpCNappI:, ERROR:, 106:, NodeAbortion, (TRAP, agent:XX, community:YY, generic:6, enterprise:cloud.ZZ, specific:10, timestamp:0, varbind:(WW.4.1, [1, 1, 0] 2)) |
|---|---|
| Prediction | 2012-4-28 17:20:13 |
| Templates of Location | {39,2,30,2}, {39,2,85,2}, {39,2,86,2}, {39,2,443,2} |
| Locations predicted | - |

LOCATIONAL PREDICTION OF FAILURES

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Prediction of failures is common. Many techniques are known for predicting when a failure is likely to occur in a process or system. In complex environments, though, prediction of the failure is incomplete. Without knowing where the failure is predicted to occur, resources are wasted trying to determine a root cause of the failure.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein:

FIG. 7 is a program listing for creating a template, according to exemplary embodiments;

FIGS. 9-10 are schematics illustrating experimental results, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1A:
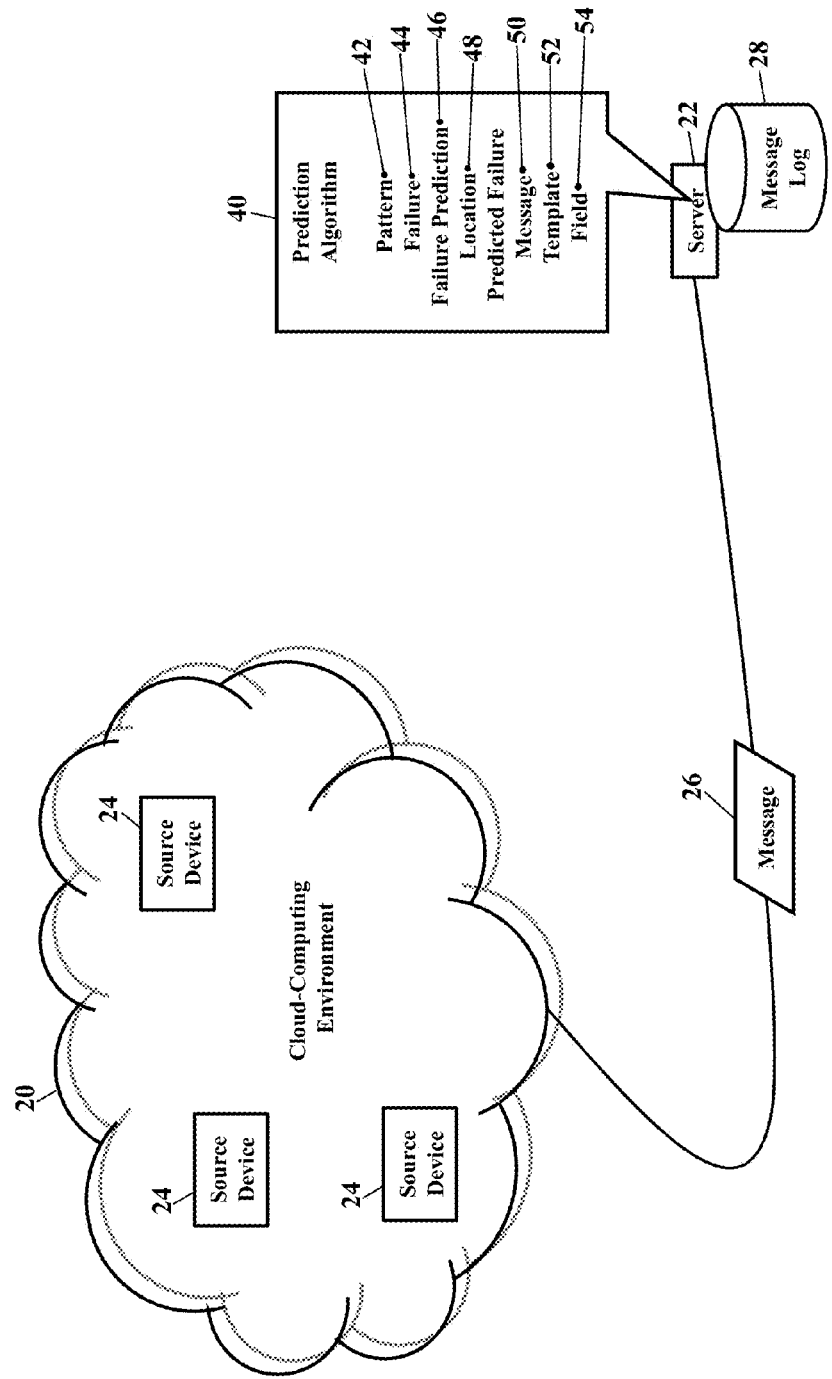
FIGS. 1A and 1B are simplified schematics illustrating environments in which exemplary embodiments may be implemented.
Figure 1B:
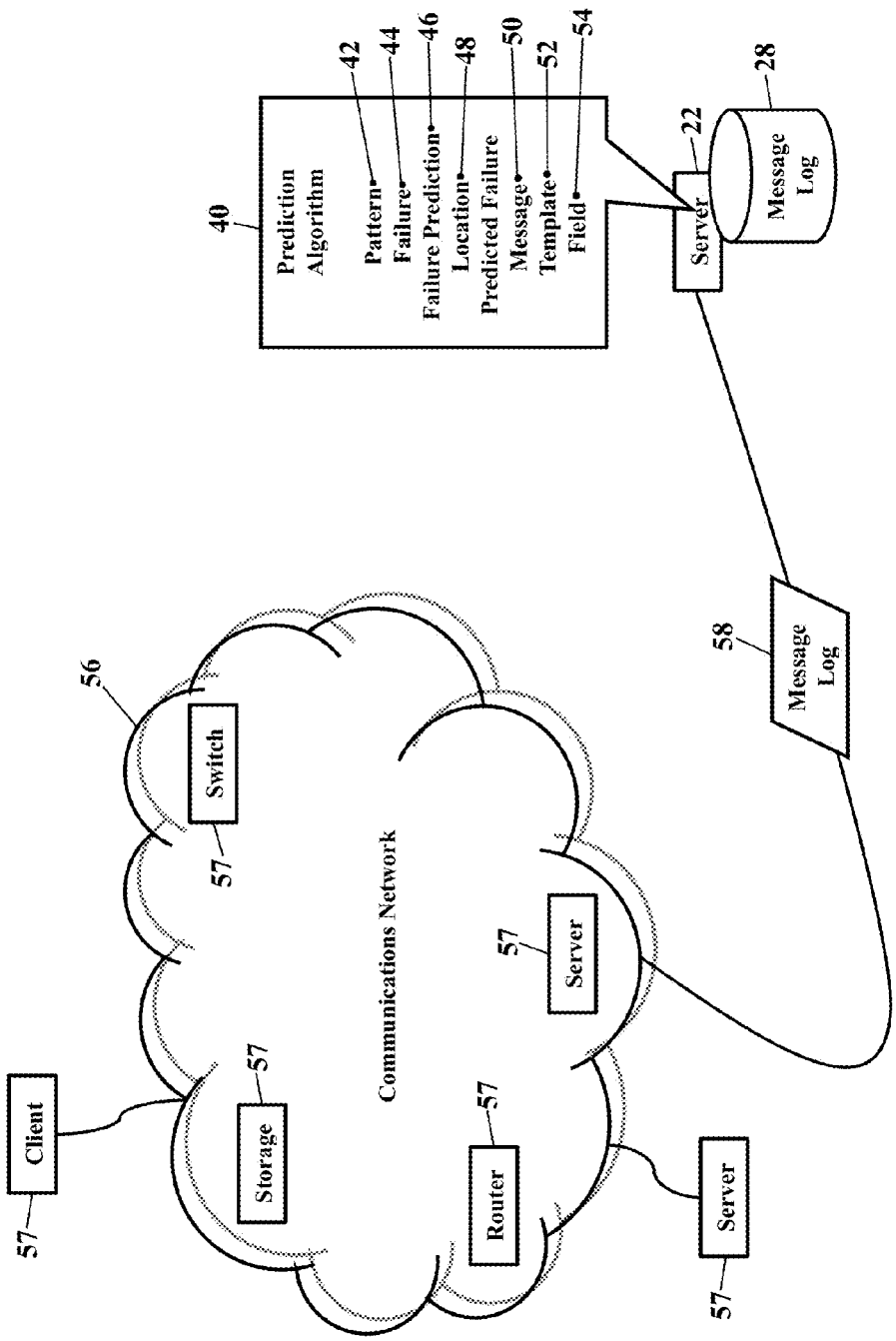

FIGS. 1A and 1B are simplified schematics illustrating an environment in which exemplary embodiments may be implemented. FIG. 1A illustrates an architecture that predicts locations of failures in a cloud-computing environment. A server 22 receives one or more messages 26 from one or more source devices 24 in a cloud-computing network 20. Each of the messages 26 may be recorded in a message log 28. FIG. 1, for simplicity, only illustrates one of the messages 26 and only a few of the source devices 24. In practice, though, the server 22 may receive thousands, even millions, of the messages 26 from hundreds or thousands of components in the cloud-computing network 20. For example, the cloud-computing network 20 may have ten thousands of the source devices 24, especially considering the many servers, switches, and storage devices in large-scale cloud data centers. In the cloud-computing environment, a cloud provider typically has one or more data centers with tens of thousands of computers, switches, storage devices, and other components. Over time, then, the server 22 may receive thousands or even millions of the messages 26. The messages 26 may all be recorded in the message log 28 for analysis.

Exemplary embodiments predict root causes of failures in the cloud-computing network 20. The message log 28 thus contains a historical database or repository of the messages 26 accumulated over time. The server 22 executes a prediction algorithm 40 that inspects the messages 26 stored in the message log 28. The prediction algorithm 40 instructs the server 22 to look for one or more patterns 42 that preceded some past failure 44 within the network 20. The server 22 may then inspect contemporaneous messages 26 for the same pattern 42. If the pattern 42 is recognized in more recent messages 26, then the server 22 may predict the same failure 44. That is, the server 22 makes a failure prediction 46 that the same failure 44 will occur at some time in the future, based on occurrence of the same pattern 42.

Exemplary embodiments may even predict a location 48 of the failure prediction 46. As the server 22 learns the pattern(s) 42 of the messages 26 in the message log 28, the server 22 may also predict what node or device will actually fail. That is, because the pattern 42 is used to predict the same failure 44, the server 22 may also predict what nodal device (e.g., host name and IP address) will fail within in the network 20. Indeed, as this disclosure will explain, exemplary embodiments may even generate a predicted failure message 50. The pattern 42 (learned from the messages 26 in the message log 28) may even be used to generate a template 52 for the failure prediction 46. The template 52 predicts the text in the fields 54 of the predicted failure message 50 that precedes the predicted failure. The predicted failure message 50 may thus include a description of the nodal location 48 of the predicted failure. So, not only may exemplary embodiments predict future failures in the network 20, but exemplary embodiments may also predict the locations of those predicted failures. Administrators and field personnel may thus be alerted to anticipate the predicted failure.

FIG. 1B illustrates an alternate operating environment in which exemplary embodiments may be implemented. Here exemplary embodiments may be used to predict locations of failures within a communications network 56. The communications network 56 may also have hundreds, if not thousands, of network components 57 (such as routers, servers, switches, network links, storage devices, and other clients). The communications network 56 may also have servers performing functions and providing services, such as firewalls, load balancers, NAT boxes, DNS servers, CDS (Content Distribution Servers), and protection devices. The communications network 56 may also connect clients to servers, and the communications network 56 may connect clients to clients (such as voice-over Internet Protocol and peer-to-peer communication). Whatever the components 57, the components 57 may send their individual message logs 58 to the server 22 for failure prediction. Each message log 58 may also be stored in the central message log 28. The server 22 executes the prediction algorithm 40 and looks for the pattern 42. If the pattern 42 is recognized in one of the recent message logs 58, then the server 22 may predict the same failure 44 and generate the failure prediction 46 for the nodal location 48. The server 22 generates the predicted failure message 50 and uses the template 52 to predict the text in the fields 54 of the predicted failure message 50 that precedes the predicted failure. The predicted failure message 50 may thus include a description of the nodal location 48 of the predicted failure. Administrators and field personnel may thus be alerted to anticipate the predicted failure in the communications network 56.

Exemplary embodiments may be applied to any system or industry. Even though FIGS. 1A and 1B illustrate locational prediction of failures in cloud-based computing and in communications environments, exemplary embodiments may be applied to any server that receives messages and/or logs from any source. Exemplary embodiments, for example, may be applied to any messages logged by computer equipment in a manufacturing process, assembly process, paint process, machining process, or industrial process. For example, the prediction algorithm 40 may predict the locations of failures in vehicular assembly plants, computer assembly facilities, and component assembly plants.

Figure 2:
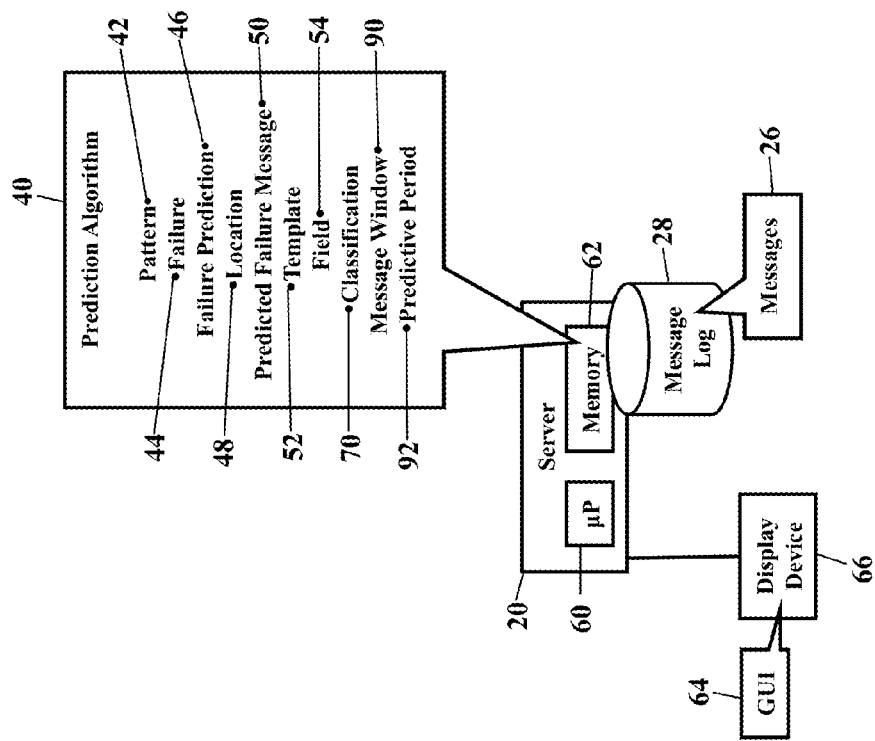
FIG. 2 is a more detailed schematic illustrating the operating environment, according to exemplary embodiments.

FIG. 2 is a more detailed schematic illustrating the operating environment, according to exemplary embodiments. The server 22 has a processor 60 (e.g., "μP"), application specific integrated circuit (ASIC), or other component that executes the prediction algorithm 40 stored in a memory 62. The prediction algorithm 40 may cause the processor 60 to produce a graphical user interface ("GUI") 64. The graphical user interface 64 is illustrated as being visually produced on a display device 66, yet the graphical user interface 64 may also have audible features. The prediction algorithm 40, however, may operate in any processor-controlled device, as later paragraphs will explain.

The server 20 may query the message log 28. FIG. 2 illustrates the message log 28 as a database or repository locally stored in the memory 62. The message log 28, however, may be remotely located and accessed from any location in the network 20. The messages 26 (and/or the individual message logs 58 illustrated in FIG. 1B) stored in the message log 28 may be any information emitted from any components.

Each message 26 may be typed. A classification 70 may be added to each message 26. Some messages may not be syntactically identical, but the messages 26 are related to the same problem (such as a disk failure). Should any messages 26 be related to the same failure 44, then the messages 26 may be classified as the same type.

Figure 3:
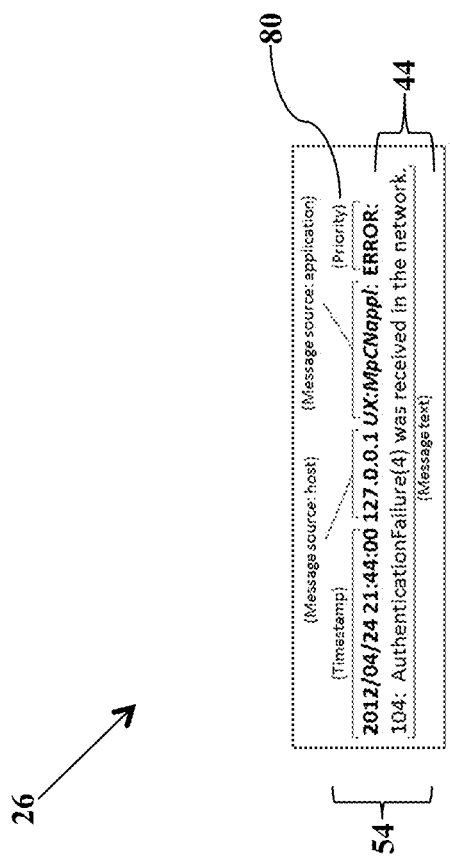
FIG. 3 is a schematic illustrating a failure message, according to exemplary embodiments.

FIG. 3 is a schematic illustrating one of the failure messages 26, according to exemplary embodiments. Each message 26 may be recorded in the message log (illustrated as reference numeral 28 in FIGS. 1-2) as an event. Moreover, each message 26 may have the various data fields 54 (e.g., timestamp, source of the message 26, priority, and message text). As FIG. 3 illustrates, each message 26 may also indicate the failure 44. The failure 44 may be an event that occurs when a delivered service deviates from a correct service. FIG. 3, as an example, illustrates the failure 44 with a priority "ERROR" (illustrated as reference numeral 80) in a field 54 of the message 26. The message log 28 may thus be sorted or arranged to only record failure messages. Indeed, failures may be recorded in separate incident databases. Exemplary embodiments define a failure event as any message 26 with a priority "ERROR" or higher.

Returning to FIG. 2, exemplary embodiments may utilize a message window 90. The message window 90 includes a set of messages recorded in the message log 28 that fall within a specified window of time. For example, exemplary embodiments may retrieve and analyze messages 26 received within the past five (5) minutes. The window of time, however, may be any length of time. The set of messages received during the message window 90 is used as a unit for learning and predicting failures.

The prediction algorithm 40 learns the pattern 42. The prediction algorithm 40 causes the processor 60 to retrieve and inspect the set of messages received during the message window 90. The prediction algorithm 40 analyzes the fields 54 in the set of messages for the matching pattern 42 between different messages 26. The message pattern 42 is then used to predict the occurrence of a future failure.

The prediction algorithm 40 may also have a predictive period 92. The predictive period 92 is a period of time from when the message pattern 42 is time-stamped until an occurrence of the actual failure 44.

Figure 4:
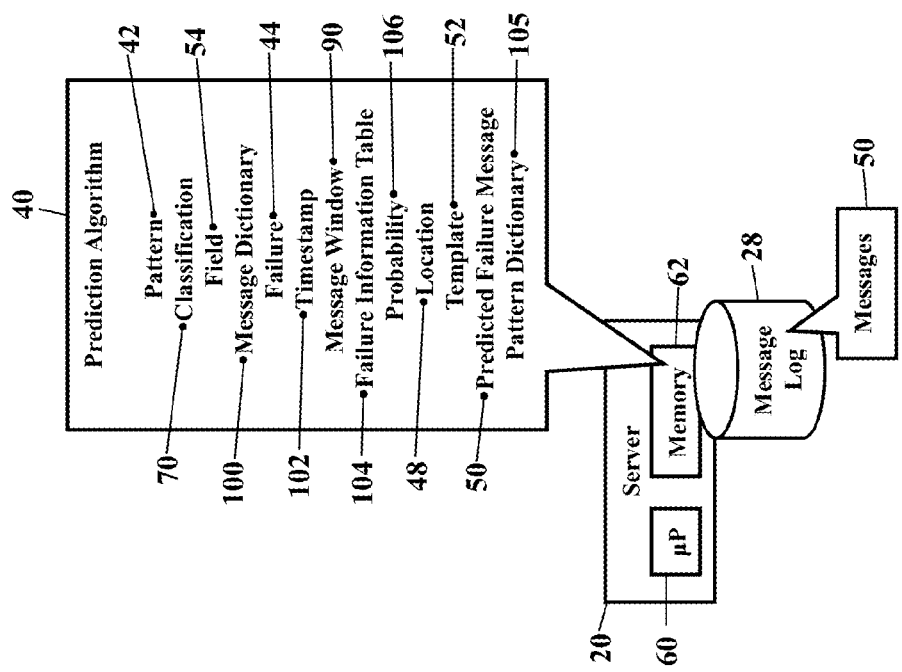
FIG. 4 is a schematic illustrating a pattern, according to exemplary embodiments.

FIG. 4 is a schematic further illustrating the pattern 42, according to exemplary embodiments. The pattern 42 is generated from the messages 26 in the message log 28. As earlier paragraphs explained, each message 26 may be typed with the classification 70. The prediction algorithm 40 inspects one or more of the fields 54 in each message 26. The prediction algorithm 40 classifies the message 26 based on one or more similarities in the message text contained within the fields 54. The prediction algorithm 40 may retrieve a message dictionary 100 that contains reference text to which each message 26 is compared. The prediction algorithm 40 may thus compare the message text in the fields 54 to the entries in the message dictionary 100. Any matches may be assigned the corresponding classification field 70.

Failure information may also be extracted. If the message 26 denotes the failure 44, the prediction algorithm 40 may extract a timestamp 102 and the classification field 70 from the message 26. The prediction algorithm 40 thus knows a type of the failure 44 (from the classification field 70) and a time associated with the failure 44. This information may be recorded in a failure information table 104 for later use.

The prediction algorithm 40 then generates the pattern 42. The message pattern 42 at a given time is the set of message types in the message window 90. This information is recorded in a message record table with id and the timestamp 102 of the message window 90. When the message pattern 42 is recorded, a learning process and a predicting process are activated. The prediction algorithm 40 thus translates the messages 26 recorded in the message log 28 into the one or more message patterns 42. The message patterns 42 may then be stored in a pattern dictionary 105 for analysis and retrieval.

The prediction algorithm 40 thus predicts failures. Because the message dictionary 100 contains reference text of known failures, the known failures may also be associated with a probability 106 of the corresponding known failure. That is, once the failure 44 is known, the probability of that same failure 44 again occurring may be determined and stored in the pattern dictionary 105. The prediction algorithm 40 compares the messages 26 received within the message window 90 to the message dictionary 100 and assigns any matches to the corresponding classification 70. The prediction algorithm 40 may then query the pattern dictionary 105 and retrieve the corresponding probability 106 of failure. The prediction algorithm 40 determines the probability 106 for each failure type using the learned probabilities. If there are one or more failure types for which the probability is higher than a threshold, the prediction algorithm 40 predicts a failure (of given type) may occur.

The prediction algorithm 40 may also identify the location 48 of the predicted failure. The prediction algorithm 40 may identify important variable fields 54 in the message type (e.g., IP address, node name). The messages 26 occurring within the message window 90 may be parsed for the message type and the field number that matches an important field value in the failure message. Given the recorded pairs (message type, field), the prediction algorithm 40 may calculate the accuracy that each pair predicts the correct value in the failure message using the historical data. At runtime, the prediction algorithm 40 may use the recorded pairs to predict the important variable fields.

Exemplary embodiments thus use template-based failure prediction. The prediction algorithm 40 learns the templates 52 that indicate how the fields 54 in the messages 26 in the message window 90 may be used to estimate the words in the predicted failure message 50. For example, these templates 52 make it possible to not only predict that a disk failure will occur but that the disk failure message will indicate the failure at node1, node2, or node3. If the prediction algorithm 40 successfully predicts the future failure 44, then the prediction algorithm 40 should be able to use the patterns 42 of relationships between the message fields 54 in the message window 90 to predict the fields 54 of the actual failure message. For example, a field in some message type in the message window 90 may often be the same as the location field in the actual failure message. The templates 52 may thus estimate each word in the predicted failure message 50. A template T, for example, may be a quadruple of integers as follows:

$$T = \{type_t, pos_t, type_s, pos_s\},$$

where $type_t$ is a message type of a target message, $pos_t$ is a position of a word in the target message, $type_s$ is the message type of a source message, and $pos_s$ is the position of the word in the source message. The target message is the predicted failure message 50 being predicted and source messages are the messages 26 in the message window 90.

Figure 5:
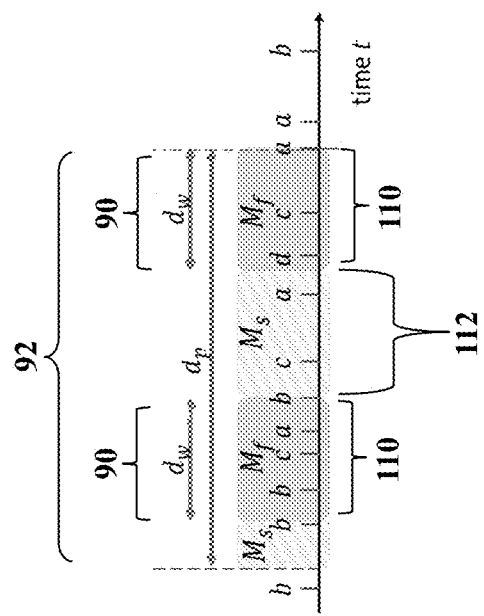
FIG. 5 is a schematic illustrating classification of message, according to exemplary embodiments.

FIG. 5 is a schematic further illustrating the classification of the messages 26, according to exemplary embodiments. FIG. 5 illustrates a set of message during the predictive period 92. The prediction algorithm 40 knows the actual failure messages 26 (stored in the message log 28) and the values of the different message fields 54 (e.g., the host name where the failure occurred). Let $f_l$ denote the actual failure message 26. Given a failure message of type $f_l$, exemplary embodiments may identify all the occurrences of this failure type in the historical data. Exemplary embodiments may also identify the predictive periods and the corresponding predictions. Let $O_f$ denote the set of these predictions and $M_f$ (illustrated as reference numeral 110) be a set of messages, initialized to an empty set. As FIG. 5 illustrates, for every prediction p in $O_f$, every message 26 in the message window 90 of p is retrieved from the message log 28 and added into $M_f$. A duration of the message window $d_w$ (illustrated as reference numeral 90), and the predictive period $d_p$ (illustrated as reference numeral 92) may be predetermined. The set $M_s$ (illustrated as reference numeral 112) illustrated in FIG. 5 denotes the messages occurring outside of the message window 90. For simplicity, the prediction algorithm 40 ignores the messages occurring outside of the message window 90.

Figure 6:
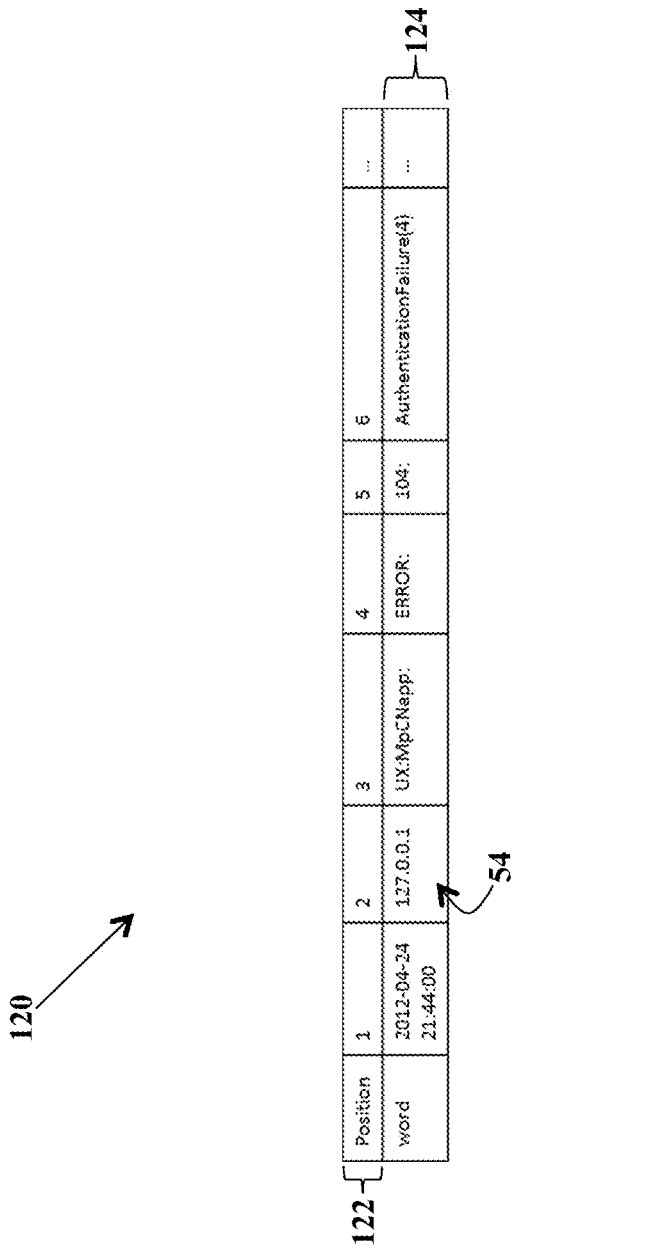
FIG. 6 is a schematic illustrating a tabular form of a message, according to exemplary embodiments.

FIG. 6 is a schematic illustrating a tabular form 120 of the message 26, according to exemplary embodiments. The prediction algorithm 40 may generate tabular forms of $f_l$ and each message in $M_f$ (illustrated in FIG. 5). Fixed message fields 54 from the message 26 (such as message source) are followed by variable numbers of fields with parsed message text. Each message 26 can be represented as a record with variable number of fields where each field 54 has a position number 122 and value 124. Message text is parsed using predefined list of delimiters, such as a white space or comma.

FIG. 7 is a program listing for a sub-algorithm for creating the template 52, according to exemplary embodiments. Given the tabular form 120 of the message (illustrated in FIG. 6), the prediction algorithm 40 may create the one or more templates 52. The prediction algorithm 40 may match words between the target message and the source message. The target message is $f_l$ and each message in $M_f$ may be the source message (perhaps analyzed one message at a time). For each pair of words in the source and target messages, the prediction algorithm 40 may compare and determine if the two words equal. If a match is found, the prediction algorithm 40 may record the template 52 that specifies the message types and positions of the matching fields, according to the sub-algorithm 40.

With reference to FIGS. 5 and 6, the prediction algorithm 40 thus predicts the actual failure message. At runtime, during the prediction phase, the prediction algorithm 40 predicts not only the type of the future failure but also at least important parts of the corresponding predicted failure message 50. The prediction algorithm 40, for example, predicts a node name, host name, and/or IP address associated with the predicted nodal failure. Should the prediction algorithm 40 predict a failure of $type_n$, the prediction algorithm 40 may access the set of messages in the current message window 90 and templates T for the given failure type$_n$. For each message in the message window 90 of the prediction, the prediction algorithm 40 may query a template database. The prediction algorithm 40 queries for the type of the message (e.g., type$_s$) and the failure of type$_n$ in the template database. If such a template exists, the prediction algorithm 40 selects wording at the position pos$_s$ of the source message and predicts the field at position pos$_t$ of the predicted target failure message.

Figure 8:
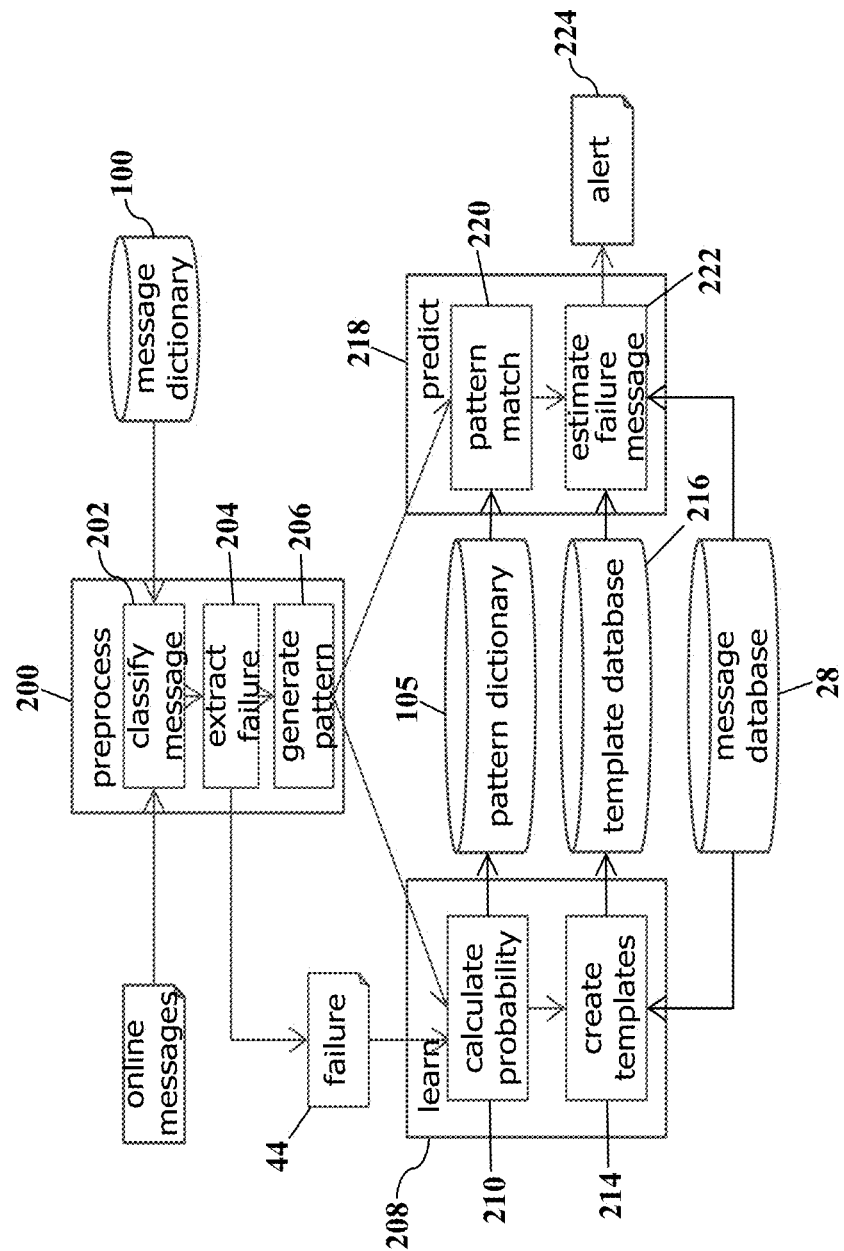
FIG. 8 is a block diagram illustrating a method of predicting locations of failures, according to exemplary embodiments.

FIG. 8 is a block diagram illustrating a method of predicting locations of failures, according to exemplary embodiments. A preprocessing phase (Block 200) consults the message dictionary 100 to determine the classification 70 of each message (Block 202). The failure information is extracted (Block 204) and the pattern 42 is generated (Block 206). The failure information and the pattern 42 are used by a learning phase (Block 208) to calculate the probability 106 of each failure (Block 210). The pattern 42 and its associated probability 106 of failure are stored in the pattern dictionary 105. The historical messages in the message log 28 are used to create the templates 52 (Block 214), and the templates 52 are stored in the template database (Block 216). A prediction phase (Block 218) uses the patterns 42 and the pattern dictionary to find a match (Block 220). The predicted failure message 50 is then predicted using the template 52 associated with the pattern 42 (Block 222). An alert is then generated (Block 224) to warn of the predicted failure at the predicted location.

Exemplary embodiments have been experimentally evaluated. A trial version of the prediction algorithm 40 was executed by a 4-core INTEL® CORE® i7-2600 (@3.40 GHz) computer with 16 GB of memory. A known dataset was used from a cloud system that consists of hundreds of physical servers. See Y. Watanabe, H. Otsuka, M. Sonoda, S. Kikuchi and Y. Matsumoto, *Online Failure Prediction in Cloud Datacenters by Real-time Message Pattern Learning*, IEEE 4$^{th}$ International Conference on Cloud Computing Technology and Science (CloudCom), 504-511 (Dec. 3-6, 2012), which is incorporated herein by reference in its entirety. In a 90-day period, over nine million (9,449,595) of the messages 26 were received, of which 112 were failures. The configuration parameters used for failure prediction are denoted in the below table. The same data set was used for the learning phase and for the prediction phase (as illustrated in FIG. 8).

TABLE 1

Configuration Parameters

| Parameter | Value |
|---|---|
| Threshold for message classification | 0.6 |
| Failure Prediction Threshold | 0.8 |
| Predictive Period | 60 min |
| Message Window Size | 5 min |

Accuracy was also evaluated. Experiments focused on one specific field (e.g., the node name) in actual failure messages. The location 48 of the failure, denoted by the node name, is naturally very important for not only trouble-shooting but also for any automated failure compensation actions executed before the failure actually occurs. Precision was used as the measure of accuracy, as precision is a widely used metric for failure prediction assessment. Precision was defined about location as the ratio of the number of predictions with the correct failure message type and location divided by the number of predictions with the correct failure message type. Specifically, precision was defined as follows:

$$\frac{\sum_{f_l \in F} |\{d \mid d \in D(f_l), \text{loc}(f_l) \in W(d)\}|}{\sum_{f_l \in F} |D(f_l)|},$$

with $D(f_l) = \{d \in D | t(f_l) = t(d), tm(f_l) \in [tm(d), tm(d)+d_p]\}$, where F: Set of all failure occurrences,
D: Set of all predictions,
t(•): type of failure/prediction,
tm(•): time of failure/prediction,
W(d): Set of locations predicted in a prediction, and
loc(f$_l$): location field of f$_l$.

This evaluation only considered the cases where the failure prediction (of a type of a failure) is correct. Defining precision of location prediction for failures that do not actually occur is not meaningful, so no attempt was made to evaluate the location prediction in cases where the occurrence of a failure was not predicted.

Template-based prediction was successful. The precision of position 1 (node name) was 81.07%. The results showed that exemplary embodiments can predict, and localize, failure with high precision. The experiment only used a five (5) minute message window 90 to search for words, in this case the node name. Table 2 (below) shows the location precision by failure type. The logical upper bound column was calculated by looking at all the messages 26 in the message window 90 and determining if any of the fields 54 contained the correct failure location. Since a template 52 can only provide the correct location if the correct location is included in at least one message in the message window 90, this provides the logical upper bound on what the approach can accomplish. The fact that many of those values are close to one (1) indicates that location prediction using just message logs is feasible.

As Table 2 also shows, precision varied widely among failure types. Precision was very high for certain failure types. This implies that exemplary embodiments can provide actionable accurate failure type and location prediction information to operators for these failure types.

TABLE 2

Precision by Failure Type

| Failure type | Number of Samples | Precision | Logical Upper Bound |
|---|---|---|---|
| 3 | 628 | 0.89 | 0.99 |
| 10 | 8 | 0.13 | 0.13 |
| 30 | 84 | 0.92 | 1.00 |
| 36 | 47 | 1.00 | 1.00 |
| 39 | 54 | 0.04 | 0.46 |
| 65 | 3 | 1.00 | 1.00 |
| 93 | 6 | 1.00 | 1.00 |
| 124 | 100 | 0.98 | 1.00 |
| 236 | 1 | 1.00 | 1.00 |
| 278 | 317 | 0.83 | 1.00 |
| 314 | 2 | 0.00 | 1.00 |
| 445 | 94 | 1.00 | 1.00 |
| 448 | 1 | 1.00 | 1.00 |
| 455 | 2 | 1.00 | 1.00 |
| 494 | 79 | 0.00 | 0.01 |
| Total | 1426 | 0.81 | 0.92 |

FIG. 9 is a schematic illustrating an exemplary threshold violation failure, according to exemplary embodiments. FIG. 9 illustrates a "Type 30" failure. About this type, a certain failure message (type 39) occurs in advance. The prediction algorithm 40 learned this relationship (as explained above). These failures are directly or indirectly related to the predicted failure. Therefore, the prediction algorithm 40 may obtain text from the positions of location information from those failure messages.

FIG. 10, however, is a schematic illustrating no locational prediction. FIG. 10 illustrates a situation in which the prediction algorithm 40 accurately predicted a failure, but the location of the failure was not predicted. Node stop error failure was predicted successfully by using the preceding failure of another node stop error on the same hardware. Although those messages included information such as the network interface of a preceding failure, the messages did not always include location information for the second failure. In some case, like with failure type 494, upper bounds are close to zero. In these cases, it is not possible to find the location information in the prediction's message window 90.

Exemplary embodiments may thus predict nodal locations of failures with high precision. Exemplary embodiments may use commonly available message logs as its only input. Exemplary embodiments combine failure occurrence prediction and location prediction into one algorithm/system and performs them at the same time. Testing shows that the system can achieve high precision in pinpointing the predicted failure location (81% with the data set) and can thus provide actionable information to system operators and automated systems. Exemplary embodiments automatically learn templates of failures from historical data.

Figure 11:
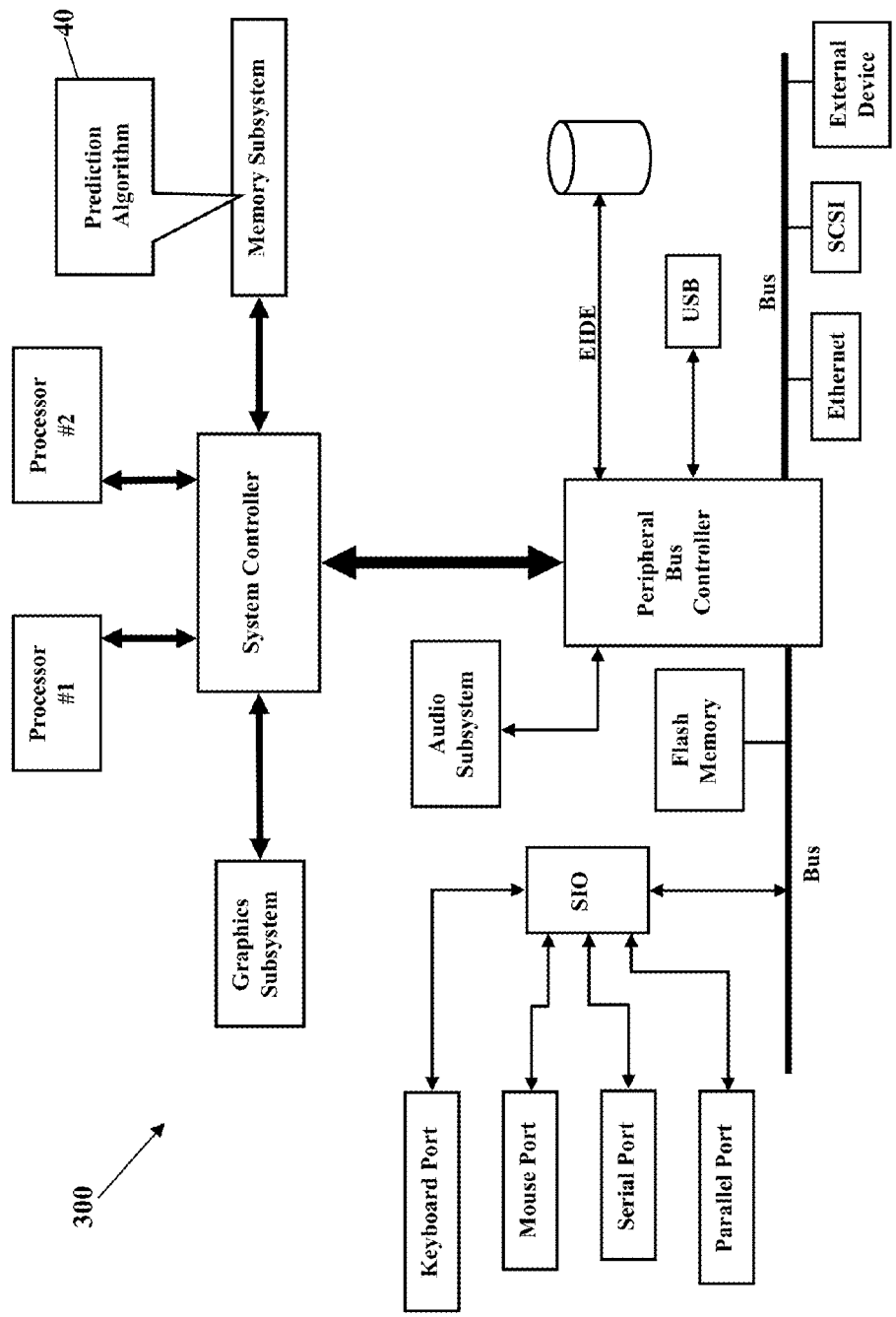
FIG. 11 is a schematic illustrating a processor-controlled device, according to exemplary embodiments.

FIG. 11 is a schematic illustrating still more exemplary embodiments. FIG. 11 is a generic block diagram illustrating the prediction algorithm 40 operating within a processor-controlled device 300. As the above paragraphs explained, the prediction algorithm 40 may operate in any processor-controlled device 300. FIG. 11, then, illustrates the prediction algorithm 40 stored in a memory subsystem of the processor-controlled device 300. One or more processors communicate with the memory subsystem and execute the prediction algorithm 40. Because the processor-controlled device 300 illustrated in FIG. 11 is well-known to those of ordinary skill in the art, no detailed explanation is needed.

Figure 12:
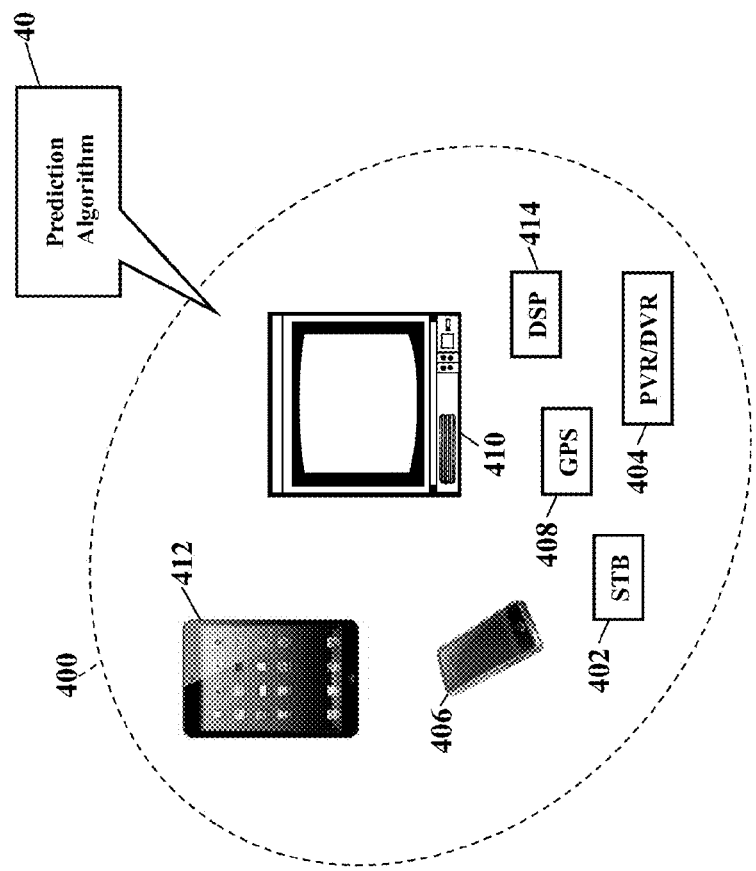
FIG. 12 depicts other possible operating environments for additional aspects of the exemplary embodiments.

FIG. 12 depicts other possible operating environments for additional aspects of the exemplary embodiments. FIG. 12 illustrates the prediction algorithm 40 operating within various other devices 400. FIG. 12, for example, illustrates that the prediction algorithm 40 may entirely or partially operate within a set-top box ("STB") (402), a personal/digital video recorder (PVR/DVR) 404, a smartphone 406, a Global Positioning System (GPS) device 408, an interactive television 410, a tablet computer 412, or any computer system, communications device, or processor-controlled device utilizing the processor 50 and/or a digital signal processor (DP/DSP) 414. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for predicting locations of failures, as explained above.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of predicting failures, comprising:
   storing, by a server, a set of messages historically received within a window of time, the set of messages describing the failures;
   retrieving, by the server, a message in the set of messages that describes one of the failures;
   comparing, by the server, text in a field of the message to corresponding text in a corresponding field contained within the set of messages;
   determining, by the server, a match between the text in the field of the message and the corresponding text in the corresponding field contained within the set of messages;
   determining, by the server, a pattern in the text;
   associating, by the server, a template to the pattern in response to the match;
   observing, by the server, the pattern in recent messages that are recently received;
   retrieving, by the server, the template associated with the pattern;
   predicting, by the server, a future failure based on observance of the pattern in the recent messages; and
   predicting, by the server, a location of the future failure based on the template.

2. The method of claim 1, further comprising selecting the location of the future failure as matching text between the text in the field of the message to the corresponding text in the corresponding field contained within the set of the messages.

3. The method of claim 1, further comprising tabulating the set of messages.

4. The method of claim 1, further comprising creating the template as a quadruple of integers.

5. The method of claim 1, further comprising creating the template as a quadruple of integers based on positions in the set of messages.

6. The method of claim 1, further comprising retrieving a probability associated with the future failure.

7. A system, comprising:
   a processor; and
   a memory storing instructions that when executed cause the processor to perform operations, the operations comprising:
   storing messages historically received within a window of time, the set of messages describing failures;
   retrieving a message in the set of messages that describes one of the failures;
   comparing text in a field of the message to corresponding text in a corresponding field contained within the set of messages;
   determining a match between the text in the field of the message and the corresponding text in the corresponding field contained within the set of messages;
   determining a pattern in the text;
   associating a template to the pattern in response to the match;

observing the pattern in recent messages that are recently received;

retrieving the template associated with the pattern;

predicting a future failure based on observance of the pattern in the recent messages; and predicting a location of the future failure based on the template.

8. The system of claim 7, wherein the operations further comprise selecting the location of the future failure as matching text between the text in the field of the message to the corresponding text in the corresponding field.

9. The system of claim 7, wherein the operations further comprise tabulating the set of messages.

10. The system of claim 7, wherein the operations further comprise creating the template as a quadruple of integers.

11. The system of claim 7, wherein the operations further comprise creating the template as a quadruple of integers based on positions in the set of messages.

12. The system of claim 7, wherein the operations further comprise retrieving a probability associated with the future failure.

13. A memory device storing instructions that when executed cause a processor to perform operations, the operations comprising:

storing messages historically received within a window of time, the set of messages describing failures;

retrieving a message in the set of messages that describes one of the failures;

comparing text in a field of the message to corresponding text in a corresponding field contained within the set of messages;

determining a match between the text in the field of the message and the corresponding text in the corresponding field contained within the set of messages;

determining a pattern in the text;

associating a template to the pattern in response to the match;

observing the pattern in recent messages that are recently received;

retrieving the template associated with the pattern;

predicting a future failure based on observance of the pattern in the recent messages; and predicting a location of the future failure based on the template.

14. The memory device of claim 13, wherein the operations further comprise selecting the location of the future failure as matching text between the text in the field of the message to the corresponding text in the corresponding field.

15. The memory device of claim 13, wherein the operations further comprise tabulating the set of messages.

16. The memory device of claim 13, wherein the operations further comprise creating the template as a quadruple of integers.

17. The memory device of claim 13, wherein the operations further comprise creating the template as a quadruple of integers based on positions in the set of messages.

* * * * *